United States Patent
Brady

(10) Patent No.: US 12,494,973 B2
(45) Date of Patent: Dec. 9, 2025

(54) DEVICE CONNECTIVITY MONITORING

(71) Applicant: Dell Products L.P., Round Rock, TX (US)

(72) Inventor: Niall Brady, Rathfarnham (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/680,002

(22) Filed: May 31, 2024

(65) Prior Publication Data
US 2025/0373504 A1     Dec. 4, 2025

(51) Int. Cl.
*H04L 41/16*     (2022.01)
*H04L 41/0816*   (2022.01)

(52) U.S. Cl.
CPC .......... *H04L 41/16* (2013.01); *H04L 41/0816* (2013.01)

(58) Field of Classification Search
CPC .............................. H04L 41/16; H04L 41/0816
See application file for complete search history.

(56) References Cited

U.S. PATENT DOCUMENTS

| | | | | |
|---|---|---|---|---|
| 2022/0150221 A1* | 5/2022 | Fiumara | ............. | G06F 18/2415 |
| 2022/0294529 A1* | 9/2022 | Janulewicz | ........ | H04B 10/0795 |
| 2023/0216762 A1* | 7/2023 | Shamdani | ........... | H04L 43/0811 |
| | | | | 709/224 |
| 2024/0130647 A1* | 4/2024 | Lee | ......................... | H04L 67/55 |
| 2024/0314044 A1* | 9/2024 | Brady | ..................... | H04L 41/16 |
| 2025/0024279 A1* | 1/2025 | Shatil | .................... | H04W 24/10 |

OTHER PUBLICATIONS

Wikipedia contributors, Multilayer perceptron, Available at: https://en.wikipedia.org/w/index.php?title=Multilayer_perceptron&oldid=1226365646 (last visited May 31, 2024).
Microsoft, Reliability in your IoT workload, Microsoft Azure Well-Architected Framework, Microsoft Learn, available at: https://learn.microsoft.com/en-us/azure/well-architected/iot/iot-reliability (last visited May 31, 2024), published Apr. 27, 2023.

\* cited by examiner

*Primary Examiner* — Philip C Lee
(74) *Attorney, Agent, or Firm* — Ryan, Mason & Lewis, LLP

(57) ABSTRACT

Methods, apparatus, and processor-readable storage media for device connectivity monitoring are provided herein. An example computer-implemented method includes obtaining data, over a time period, associated with (i) a connectivity configuration of a device and (ii) at least one set of events related to a current connectivity state of the at least one processing device, where at least a portion of the data is obtained from the device and one or more components involved in communications with the device. The method includes generating, by a machine learning model, a connectivity score for the device based on the data, where the connectivity score indicates a probability of a device experiencing at least one connectivity issue. The method also includes initiating, in response to the connectivity score satisfying at least one designated threshold, one or more automated actions to mitigate the connectivity issue.

20 Claims, 10 Drawing Sheets

| DEVICE SERIAL NUMBER | PRODUCT TYPE | D-F | D-F₋₁ | D-EC | D-EC₋₁ | D-DC | GW | GW₋₁ | GW-P | BE- DK |
|---|---|---|---|---|---|---|---|---|---|---|
| 1234ABC | STORAGE PRODUCT A | 2.4.10.1 | 2.3.6.9 | 4.1 | 4.1 | Y | 5.18 | 5.16 | Y | 29-NOV-23 03.29.41.667923 AM ETC/UTC |
| 1235CDE | STORAGE PRODUCT A | 2.5.2.3 | 2.5.2.3 | 4.2 | 3.9 | Y | 5.16 | 5.10 | Y | 08-DEC-23 07.03.09.948414 AM ETC/UTC |
| 1236DEF | STORAGE PRODUCT B | 4.5.23 | 4.4.11 | 4.1 | 3.7 | N | 5.18 | 5.16 | N | 05-DEC-23 09.59.29.594085 PM ETC/UTC |
| 1237EFG | STORAGE PRODUCT B | 4.4.11 | 4.4.11 | 3.18 | 3.18 | N | 3.56 | 3.56 | N | 07-DEC-23 03.19.09.488307 PM ETC/UTC |
| 1238FGH | STORAGE PRODUCT A | 2.3.7.1 | 2.0.10 | 3.20 | 3.18 | N | 5.10 | 5.10 | Y | 14-DEC-23 02.13.40.472556 AM ETC/UTC |
| 1239GHI | STORAGE PRODUCT B | 4.0.16 | 4.0.16 | 4.0.4 | 3.8.1 | Y | 5.16 | 5.10 | N | 15-DEC-23 02.08.48.493778 AM ETC/UTC |

D-F: Device Firmware Version
D-F₋₁: Previous Device Firmware Version
D-EC: Device Embedded Connectivity Agent Version
D-EC₋₁: Previous Device Embedded Connectivity Agent Version
D-DC: Device Direct Connect Enabled?

GW: Gateway Version
GW₋₁: Previous Gateway Version
GW-P: Does Gateway Have a Proxy Configuration?
BE-DK: Backed Device Key Validation Timestamp

FIG. 3

| EVENT TYPES | SCORE ADJUSTMENT | INVERSE EVENT TYPE | SCORE ADJUSTMENT |
|---|---|---|---|
| "NO HEARTBEAT" ALARM | +0.3 | FIRST HEARTBEAT RECEIVED AFTER "NO HEARTBEAT" ALARM | -0.3 |
| BACKEND APPLICATION PROGRAMMING INTERFACE (API): EXCESSIVE 4XX ERROR WITHIN DESIGNATED TIME PERIOD | +0.4 | THRESHOLD FOR STEADY-STATE API USAGE REACHED | -0.4 |
| SEVERITY 1 CASE FOR CONNECTIVITY ISSUE | +0.8 | CASE RESOLVED | -0.8 |
| SEVERITY 2 CASE FOR CONNECTIVITY ISSUE | +0.6 | CASE RESOLVED | -0.6 |
| SEVERITY 3 CASE FOR CONNECTIVITY ISSUE | +0.4 | CASE RESOLVED | -0.4 |
| "NO TELEMETRY" ALARM | +0.3 | THRESHOLD FOR STEADY-STATE TELEMETRY REACHED | -0.3 |
| REMOTE SESSION TERMINATED WITH EXCEPTION | +0.3 | THRESHOLD NUMBER OF CONSECUTIVE SUCCESSFULLY COMPLETED REMOTE SESSIONS | -0.3 |

| INDEX | PRODUCT TYPE | D-F | D-F$_{-1}$ | D-EC | D-EC$_{-1}$ | D-DC | GW | GW$_{-1}$ | GW-P | BE- DK | CONNECTIVITY SCORE |
|---|---|---|---|---|---|---|---|---|---|---|---|
| 1 | STORAGE PRODUCT A | 2.4.10.1 | 2.3.6.9 | 4.1 | 4.1 | Y | 5.18 | 5.16 | Y | 29-NOV-23 03.29.41.66792 3 AM ETC/UTC | 1.2 |

DEVICE CONNECTIVITY MONITORING

BACKGROUND

Effective monitoring of device connectivity is a significant factor for maintaining the performance and reliability of communication networks, particularly in complex edge networks where there may be a large number of devices, protocols, and network configurations. Service providers often rely on monitoring and telemetry systems to manage services such as data processing, storage, and analytics across various infrastructures, including physical and virtual infrastructures, public cloud deployments, and on-site installations.

SUMMARY

Illustrative embodiments of the disclosure provide techniques for device connectivity monitoring. An exemplary computer-implemented method includes obtaining data, over a time period, associated with (i) a connectivity configuration of at least one processing device and (ii) at least one set of events related to a current connectivity state of the at least one processing device, wherein at least a portion of the data is obtained from the at least one processing device and one or more components involved in communications with the at least one processing device. The method includes generating, by a machine learning model, a connectivity score for the at least one processing device based on the data, wherein the connectivity score indicates a probability of the at least one processing device experiencing at least one connectivity issue. The method also includes initiating, in response to the connectivity score satisfying at least one designated threshold, one or more automated actions to at least partially mitigate the at least one connectivity issue.

Illustrative embodiments of the present invention can provide significant advantages relative to conventional techniques. For example, technical problems associated with maintaining connectivity architectures (e.g., complex connectivity architectures) are mitigated in one or more embodiments by providing a predictive and preventative approach for managing device connectivity.

These and other illustrative embodiments described herein include, without limitation, methods, apparatus, systems, and computer program products comprising processor-readable storage media.

BRIEF DESCRIPTION OF THE DRAWINGS

FIG. 3 shows an example of device data in an illustrative embodiment.

FIG. 4 shows a table comprising event types and connectivity score adjustments in an illustrative embodiment.

FIG. 6 shows a combined connectivity data record in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Many service providers have developed complex networks and systems for managing virtual and/or hardware infrastructure provided to consumers. For example, service providers can collect telemetry data from various devices and implement processing pipelines for detecting faults, monitoring performance, and customer success management.

Telemetry or usage data is an important factor in satisfying service-level agreements (SLAs). For example, some service providers invest in device capabilities to detect events and report them to backend servers, as well as backend capabilities to process such events. Connectivity services have also been designed to enable remote diagnosis, remediation, and resolution activities from a backend system to user devices.

Loss of connectivity between a given device and a provider's backend system can have significant consequences, including service degradation, and penalties due to missed SLAs. Enterprise connectivity architectures are often complex, with multiple components communicating with each other through secure networks. As a non-limiting example, device firmware or operating systems can communicate with embedded connectivity agents, which communicate with edge gateways that are connected through one or more networks to a backend system.

The backend system is often deployed across multiple datacenters within another highly complex network. Given the importance of maintaining device connectivity, service providers often deploy monitoring and observability solutions within their networks. Additionally, onsite connectivity agents and edge components are configured to send heartbeat and/or keepalive signals. A heartbeat signal generally refers to a periodic message exchanged between two or more systems and/or devices. In some examples, if a receiving system does not receive a heartbeat message within a designated time period, it assumes that the other system or device has become unresponsive and/or lost connectivity. A keepalive signal generally refers to a message used to prevent inactive connections from being terminated (e.g., due to inactivity).

Conventional approaches are often limited to reactive capabilities. One or more embodiments described herein provide device connectivity monitoring that can proactively detect, and attempt to mitigate, potential connectivity issues.

Figure 1:
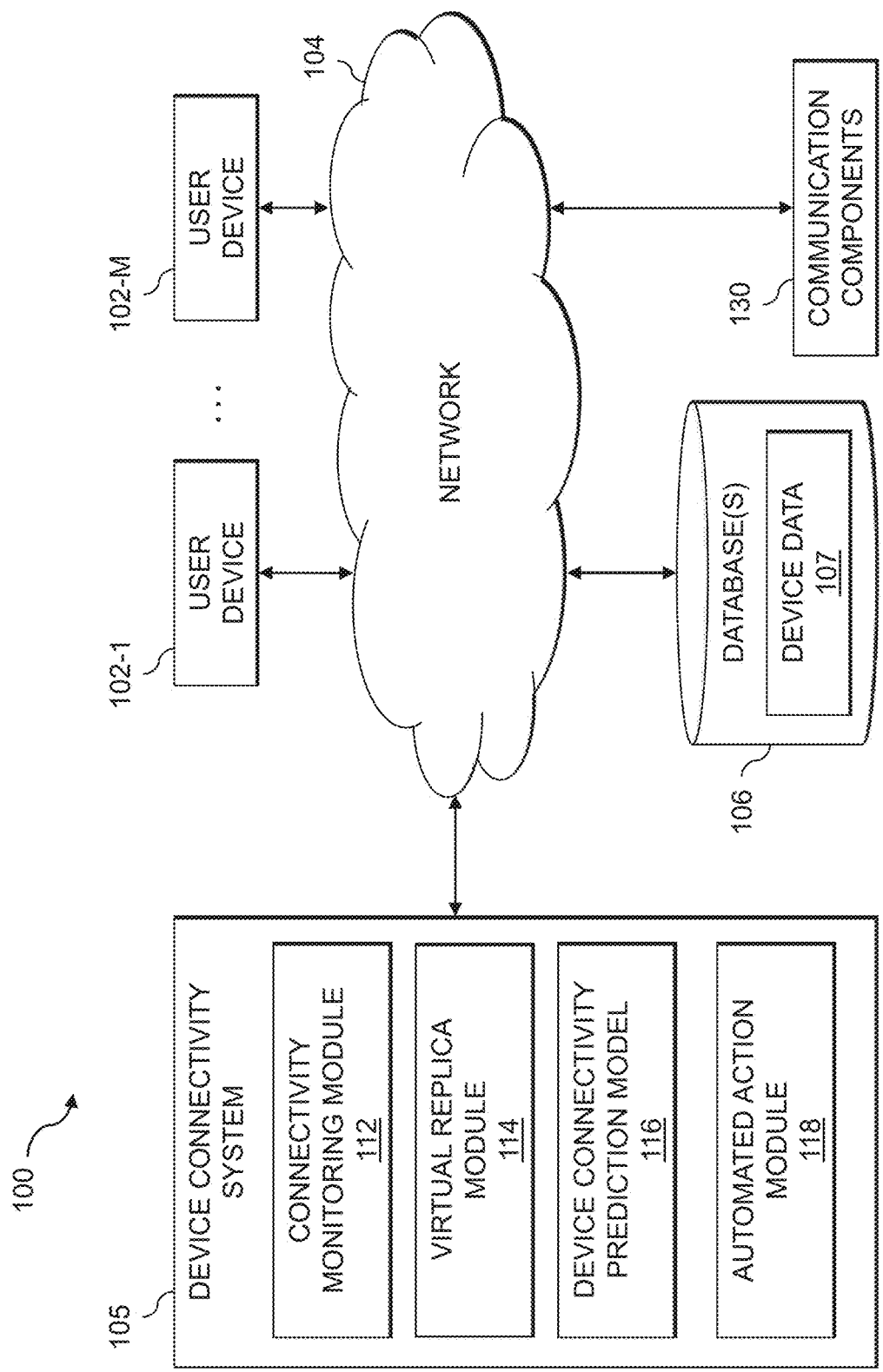
FIG. 1 shows an information processing system configured for device connectivity monitoring in an illustrative embodiment.

FIG. 1 shows a computer network (also referred to herein as an information processing system) 100 configured in accordance with an illustrative embodiment. The computer network 100 comprises a plurality of user devices 102-1, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a device connectivity system 105 and one or more communication components 130.

The user devices 102 may comprise, for example, servers and/or portions of one or more server systems, as well as devices such as mobile telephones, laptop computers, tablet computers, desktop computers, Internet of Things (IoT) devices, or other types of computing devices. Such devices are examples of what are more generally referred to herein as "processing devices." Some of these processing devices are also generally referred to herein as "computers."

The user devices 102 in some embodiments comprise respective computers associated with a particular company, organization, or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The communication components 130, in some embodiments, can correspond to hardware components of one or more service providers (e.g., backend servers of such service providers and/or portions of one or more server systems) and/or other communication components used for facilitating communications involving one or more of the user devices 102. At least some of the communication components 130 can be implemented in a similar manner as user device 102. The communication components 130 may alternatively or additionally include one or more routers, switches, and/or gateways, at least some of which may be part of the network 104.

Additionally, the device connectivity system 105 can have at least one associated database 106 configured to store device data 107 pertaining to, for example, connectivity configurations of the user devices 102 and/or the one or more communication components 130. The device data 107 may alternatively or additionally pertain to connectivity events associated with the user devices 102 or the communication components 130, for example.

An example database 106, such as depicted in the present embodiment, can be implemented using one or more storage systems associated with the device connectivity system 105. Such storage systems can comprise any of a variety of different types of storage including network-attached storage (NAS), storage area networks (SANs), direct-attached storage (DAS), and distributed DAS, as well as combinations of these and other storage types, including software-defined storage.

Also associated with the device connectivity system 105 are one or more input-output devices, which illustratively comprise keyboards, displays or other types of input-output devices in any combination. Such input-output devices can be used, for example, to support one or more user interfaces to the device connectivity system 105, as well as to support communication between the device connectivity system 105 and other related systems and devices not explicitly shown.

Additionally, the device connectivity system 105 in the FIG. 1 embodiment is assumed to be implemented using at least one processing device. Each such processing device generally comprises at least one processor and an associated memory, and implements one or more functional modules for controlling certain features of the device connectivity system 105.

More particularly, the device connectivity system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the device connectivity system 105 to communicate over the network 104 with the user devices 102, and illustratively comprises one or more conventional transceivers.

The device connectivity system 105 further comprises a connectivity monitoring module 112, a virtual replica module 114, a device connectivity prediction model 116, and an automated action module 118.

Generally, the connectivity monitoring module 112 obtains data from the one or more user devices 102 and/or the communication components 130. At least portions of the data can be stored in the database 106 as device data 107, for example. In some embodiments, the virtual replica module 114 can maintain virtual replicas (also referred to as "digital twins") of the user devices 102 and communication components 130 to facilitate substantially real-time monitoring and analysis of a connectivity state (also referred to herein as connectivity health), for example.

In this context and elsewhere herein, "real time" refers to the ability to generate, collect, process, and/or respond to data with minimal delay. While the exact timeframe may vary depending on the specific implementation, real-time processing typically involves delays measured in milliseconds or seconds.

Also, the term "virtual replica" in this context and elsewhere herein is intended to be broadly construed so as to encompass, for example, a digital representation of at least portions of a physical device and/or system. In at least some embodiments, a given virtual replica can be created and/or updated based on the data obtained by the connectivity monitoring module 112, as explained in more detail elsewhere herein.

In some embodiments, the device connectivity prediction model 116 comprises a machine learning model that is trained on historical data to predict potential connectivity issues with one or more of the user devices 102 based on changes in connectivity configurations and/or connectivity events.

As a non-limiting example, the device connectivity prediction model 116 can comprise a feedforward neural network, such as a Multilayer Perceptron (MLP) network. Generally, an MLP network comprises a set of interconnected nodes organized into layers. The layers can include an input layer, one or more hidden layers, and an output layer. Each connection between a pair of nodes includes a weight for determining the impact that the output of one neuron has on the input of another neuron in the subsequent layer. The input layer receives the data and passes it to the first hidden layer. Each node in the hidden layers receives input from the previous layer, performs a weighted sum, applies a nonlinear activation function, and passes the result to the next layer. The output layer then generates the final prediction, which in some embodiments corresponds to a connectivity score. In some embodiments, the connectivity score represents a connectivity state (or health) of a given user device 102. For example, the connectivity score can indicate a probability of the given user device 102 experiencing a connectivity issue in the future.

It is to be appreciated that other types of machine learning models can be used in alternative embodiments, such as a recurrent neural network (RNN) model, a random forest of trees model, or a gradient boosting model, as non-limiting examples. Generally, RNNs are artificial neural networks designed to process sequential data, with loops in their architecture that allow information to persist across multiple time steps. This enables them to maintain an internal memory (a "hidden state") that captures past information and influences input processing. The hidden state is updated at each time step to incorporate new input while retaining relevant information from previous steps. Random forests comprise an ensemble learning model that utilizes multiple decision trees. Each tree is trained on a bootstrapped sample of the data, and at each node, a random subset of features is considered for splitting. The final prediction is determined by aggregating the predictions of individual trees. Gradient boosting is another ensemble machine learning model that sequentially trains an ensemble of prediction models (e.g., shallow decision trees) in a stage-wise manner. Each subsequent tree fits the residuals of the previous trees to correct errors, minimizing a loss function (e.g., mean squared error) in an iterative process.

A connectivity issue may include, for example, a loss or a degradation in connectivity. A training process for an MLP network generally includes adjusting the weights of the connections based on the difference between predicted and actual outputs, thereby enabling the MLP network to make accurate predictions or classifications on new, unseen data. An example of a process for training the device connectivity prediction model 116 is discussed in more detail in conjunction with FIG. 7, for example.

The automated action module 118 can be configured, for example, to initiate one or more automated actions for attempting to mitigate potential connectivity issues. In some embodiments, the automated actions can include performing a blocking process that prevents a device from connecting to one or more components (e.g., communication components 130) until the issue is resolved; generating one or more alerts (e.g., to one or more users and/or one or more system administrators); executing one or more automated diagnostic tests on the device to identify and/or troubleshoot potential causes of the connectivity issue; performing one or more maintenance and/or repair operations to address the predicted connectivity issue; automatically adjusting the one or more configuration settings to improve performance and/or reduce the likelihood of connectivity issues; and/or performing one or more software updates and/or firmware updates. The automated actions may alternatively or additionally include implementing one or more workarounds to enable the device to continue functioning despite the predicted connectivity issue, automatically escalating the issue to a support team for further investigation and resolution, scheduling one or more maintenance tasks, and/or providing recommendations to users about how to prevent or mitigate connectivity issues.

It is to be appreciated that this particular arrangement of elements 112, 114, 116, and 118 illustrated in the device connectivity system 105 of the FIG. 1 embodiment is presented by way of example only, and alternative arrangements can be used in other embodiments. For example, the functionality associated with the elements 112, 114, 116, and 118 in other embodiments can be combined into a single element, or separated across a larger number of modules. As another example, multiple distinct processors can be used to implement different ones of the elements 112, 114, 116, and 118 or portions thereof.

At least portions of elements 112, 114, 116, and 118 may be implemented at least in part in the form of software that is stored in memory and executed by a processor.

It is to be understood that the particular set of elements shown in FIG. 1 for device connectivity system 105 involving user devices 102 of computer network 100 is presented by way of illustrative example only, and in other embodiments additional or alternative elements may be used. Thus, another embodiment includes additional or alternative systems, devices, and other network entities, as well as different arrangements of elements and other components. For example, in at least one embodiment, one or more of the device connectivity system 105, the communication components 130, and/or the at least one databases 106 can be on and/or part of the same processing platform.

An exemplary process utilizing elements 112, 114, 116, and 118 of an example device connectivity system 105 in computer network 100 will be described in more detail with reference to, for example, the flow diagram of FIG. 8.

A device's connectivity health is often controlled and impacted by various technology components on the device itself, as well as components within a service consumer environment, backend system, and digital infrastructure. Accordingly, some embodiments generate a first dataset based on characteristics of the device, characteristics of one or more communication components associated with the device, and/or characteristics associated with a backend system related to the device. The dataset can be used to determine the device's connectivity configuration (or connectivity profile).

For example, the characteristics of the device may include at least some of the following: a device type and/or version; firmware, operating system, and possibly other software versions; a type and version of one or more embedded connectivity agents; whether a direct connectivity option is enabled and/or supported (e.g., whether the device is configured to bypass edge gateways); one or more permissions associated with remote access; a state of one or more certificates; a state of one or more security keys. For clustered products (e.g., a cluster of computing nodes), the characteristics can include a device type and version of a primary, or lead, computing node; firmware, operating system, and possibly other software versions of the primary computing node; a type and/or version of embedded connectivity agents of the primary computing node.

Characteristics associated with a given communication component (e.g., an edge gateway) can include a gateway type and version and one or more configuration attributes (e.g., a proxy configuration, one or more policy permissions, designated exceptions and/or restrictions, clustering and/or redundancy configurations, data collection agents, backend communication protocols, and/or datacenter configurations). For the backend system, the characteristics can include device certificate metadata; device security key metadata; application programming interface (API) metadata, and/or audit data, for example.

In some embodiments, a connectivity state of the device can be determined by building a second dataset using data from multiple sources. For example, the second dataset can comprise information associated with one or more connectivity indicators (e.g., a message protocol status, such as Message Queuing Telemetry Transport (MQTT)) and/or one or more time thresholds (e.g., corresponding to heartbeat signals and/or telemetry signals). The second dataset can also include information corresponding to one or more monitoring services (e.g., services that flag the device as breaching one or more exception thresholds at network or application level) and support data (e.g., cases generated by service consumers and/or service providers concerning connectivity issues related to the device).

According to at least one embodiment, the first and second datasets can be combined at a given point in time and at scale for an entire connected installed base of devices. The combined dataset can then be used to determine connectivity configurations that lead to outcomes resulting in connectivity loss for a given device. Since the connectivity profile dataset can be built from a relatively small set of possible values, a granular analysis can be performed to identify attribute changes that result in a transition from a healthy connectivity state to an unhealthy state.

Figure 2:
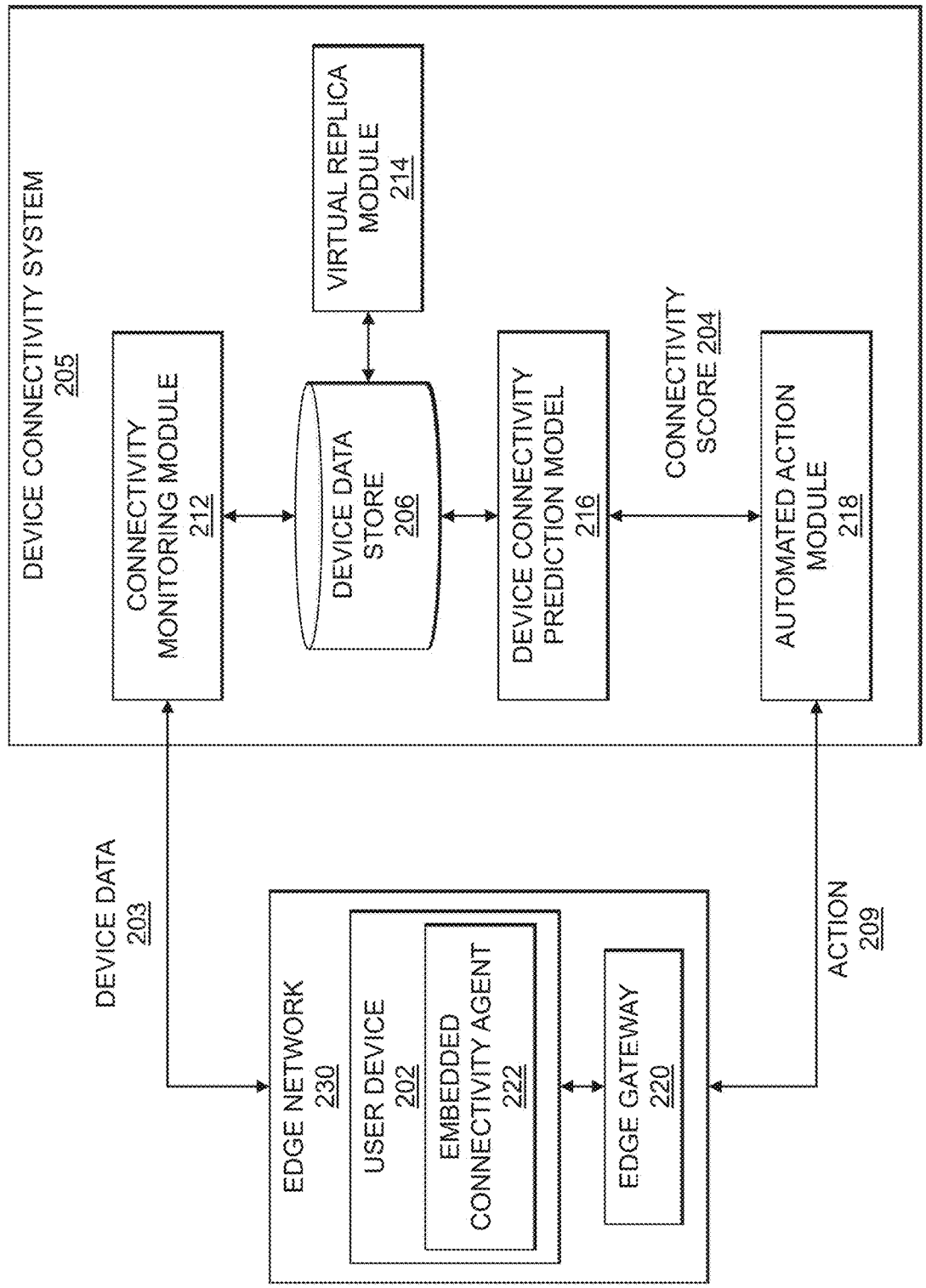
FIG. 2 shows an example data connectivity monitoring architecture in an illustrative embodiment.

FIG. 2 shows an example data connectivity monitoring architecture in an illustrative embodiment. In this example, the data connectivity monitoring architecture comprises a device connectivity system 205 (e.g., corresponding to device connectivity system 105 in FIG. 1) and an edge network 230 (e.g., corresponding to the user devices 102 and at least a portion of the communication components 130, for example). The edge network 230 comprises at least one user device 202 and an edge gateway 220. The user device 202 comprises an embedded connectivity agent 222 that is configured to send device data 203 to a connectivity monitoring module 212 of the device connectivity system 205 via the edge gateway 220. The device data 203 may include, for example, one or more device characteristics, one or more heartbeat messages, and/or telemetry data, for example. In some embodiments, the edge gateway 220 may also send data to the connectivity monitoring module 212, such as one or more characteristics associated with the edge gateway 220.

In some embodiments, the device data 203 can correspond to a designated set of attributes from multiple technology components involved in end-to-end device connectivity with a single, denormalized row per device, as shown in FIG. 3, for example.

FIG. 3 shows an example of device data 300 (e.g., collected by the connectivity monitoring module 212) in an illustrative embodiment. In this example, the device data 300 is collected for a plurality of devices. Columns 302 of the device data 300 are assumed to be collected from respective devices, and include device serial numbers, product types, device firmware versions (D-F), and previous device firmware versions (D-$F_{-1}$). Columns 304 of the device data 300 correspond to characteristics of embedded connectivity agents (e.g., embedded connectivity agent 222). More specifically, columns 304 include values for a device embedded connectivity agent version (D-EC), a previous device embedded connectivity agent version (D-$EC_{-1}$), and values indicating whether or not the respective devices are enabled with a device direct connection option (D-DC). Columns 306 correspond to data from edge gateways (e.g., edge gateway 220) and include values for a gateway version (GW), values for a previous gateway version (GW$_{-1}$), and values indicating whether or not a gateway includes a proxy configuration (GW-P). Column 310 of the device data 300 includes a backed device key validation timestamp collected from a backend system. In some embodiments, the backend system can correspond to the device connectivity system 205, for example.

Referring again to FIG. 2, the device connectivity system 205 can store the device data 203 in a device data store 206. In some embodiments, a virtual replica module 214 can maintain virtual replicas of the user device 202, and possibly other user devices in the edge network 230. For example, the virtual replica module 214 can update virtual replicas in the device data store 206 as the device data 203 is received. A given row in the device data 300 can correspond to a virtual replica of the user device 202 and a virtual replica of the corresponding edge gateway 220. In some embodiments, the user device 202 and the edge gateway 220 are synchronized, in near real-time, with the virtual replicas of the user device 202 and the edge gateway 220. Accordingly, the device connectivity system 205 has access to a complete and current dataset for different devices and components in the edge network 230.

The device connectivity system 205 also includes a device connectivity prediction model 216, that processes the device data 203 to predict a connectivity score 204 for the user device 202. The predicted connectivity score is obtained by an automated action module 218. If the predicted connectivity score 204 is above a threshold value, then the automated action module 218 can initiate at least one action 209 for attempting to mitigate potential connectivity issues with the at least one user device 202, for example.

In some embodiments, the automated actions can include performing a blocking process that prevents a device from connecting to one or more components (e.g., communication components 130) until the issue is resolved; generating one or more alerts (e.g., to one or more users and/or one or more system administrators); executing one or more automated diagnostic tests on the device to identify and/or troubleshoot potential causes of the connectivity issue; performing one or more maintenance and/or repair operations to address the predicted connectivity issue; automatically adjusting the one or more configuration settings to improve performance and/or reduce the likelihood of connectivity issues; and/or performing one or more software updates and or firmware updates. The automated actions may alternatively or additionally include implementing one or more workarounds to enable the device to continue functioning despite the predicted connectivity issue, automatically escalating the issue to a support team for further investigation and resolution, scheduling one or more maintenance tasks, providing recommendations to users about how to prevent or mitigate connectivity issues, and/or providing a collection of diagnostic data to a user, a next-best-action automated process, and/or an artificial intelligence virtual assistant.

In some embodiments, the device connectivity prediction model 216 can be trained and tested using batches of device data in an offline process. Once trained, the device connectivity prediction model 216 can be used for online inference, as explained in more detail in conjunction with FIG. 7, for example. Transformations may be replicated during inference at real-time levels of performance, and thus the device data 203, in some embodiments, is maintained in a simple format to reduce, or minimize, transformations.

The device data store 206 can also include a second dataset related to events that can potentially affect the connectivity state of the user device 202. For example, the second dataset can be used to determine a connectivity state of the user device 202 based on such events. By way of example, when the user device 202 initially establishes a connection with the backend system (e.g., the device connectivity system 205), the connectivity state of the user device 202 can be considered "healthy." Subsequent events can change the connectivity state along a scale indicating healthiness and unhealthiness. It is noted that a connectivity state can be non-binary. For instance, telemetry may be sent normally from the user device 202, but virtual replica messages may have one or more anomalies. As another example, remote sessions can be established, but unexpectedly drop. Therefore, the connectivity score can reflect a sequence of heterogeneous events relevant to the device connectivity state. In at least some embodiments, the user device 202 is initially assigned a healthy or default state, which corresponds to a designated connectivity score (e.g., 0). Subsequent events indicative of declining health can be quantified and added to this initial value.

FIG. 4 shows a table 400 comprising event types and connectivity score adjustments in an illustrative embodiment. The table 400 includes various types of events and inverse events that can affect the connectivity score of a device. The types of events shown in FIG. 4 are merely examples, and the types of events and/or the number of events can depend on the extent such events can be monitored, for example. More generally, each type of event should be consistently and reliably measurable, and also have consistently and reliably measurable inverse events such that the connectivity score can return to a default state. In this example, it is assumed that a connectivity score that is equal to zero is considered healthy, and a higher connectivity score indicates that the connectivity state of the device is less healthy.

Figure 5:
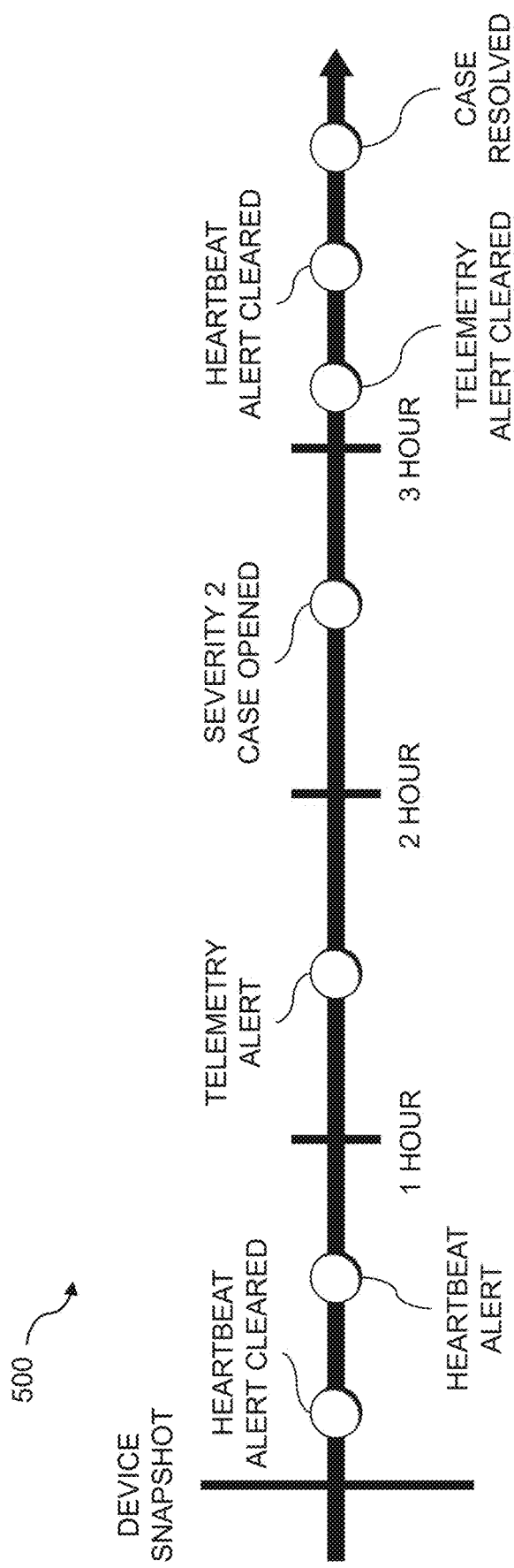
FIG. 5 shows a timeline of events for a given device in an illustrative embodiment.

FIG. 5 shows a timeline 500 of events for a given user device in an illustrative embodiment. In this example, the events shown in the timeline 500 correspond to the types of events in table 400. More specifically, it is assumed that the user device has a corresponding device snapshot representing the connectivity configuration of the device. A set of events occurs during the timeline 500, including a heartbeat alert, a telemetry alert, a severity 2 case being opened, clearing the heartbeat and telemetry alerts, and resolution of the case. It is noted that the initial "heartbeat alert cleared" event is for an event prior to the device snapshot. The set of events in the timeline 500 can be tracked and then used in an offline process to train the device connectivity prediction model 216 or to perform online inferencing to determine a current connectivity score of the device, if the device connectivity prediction model 216 is already trained.

In some embodiments, to establish a probabilistic causation relationship between the dataset corresponding to the connectivity configuration and the dataset corresponding to a set of events using the device connectivity prediction model 216, a combined dataset record can be created that aligns the timeframes of such datasets. Such causal relationships can be established by utilizing the timeframes employed for threshold-based or time-dependent status metrics and/or analyzing the time delay associated with creating support cases once connectivity issues are detected.

Additionally, capturing snapshots of the same device at multiple points in time provides insights when training and testing the device connectivity prediction model 216 by focusing on a number of known device configurations rather than a quantity of devices being trained or tested. By adopting this approach, some embodiments can help train the device connectivity prediction model 216 to identify patterns and relationships between connectivity configurations and connectivity states, thereby enabling the quantification of probabilistic causation relationships.

In some embodiments, a device snapshot for a connectivity state can be generated based on the following algorithm:

1. Select random points in time for a given device at which no connectivity-related events have occurred within a preceding timeframe (e.g., one day) prior to the selected point in time (e.g., the device snapshot shown in FIG. 5).
2. Remove negative or inverse events that occur subsequent to the device snapshot and are not accompanied by a corresponding positive event.
3. Apply a scoring adjustment (e.g., as shown in FIG. 4) for any events according to the designated timeframe rules for each event type. For example, the timeframes for the events shown in FIG. 4 may include: heartbeat or telemetry alarms occurring within a two-hour window relative to the device snapshot; a severity 1 case event within a two-hour window; and a severity 2 case event within a three-hour window.
4. Calculate the connectivity score. For example, in the timeline 500, the connectivity score for the device snapshot may be calculated as follows: 0 (initial score)+0.3 (no heartbeat alarm)+0.3 (no telemetry alarm)+0.6 (severity 2 case)=1.2.

At least some embodiments can combine the computed connectivity score with the other datasets for purposes of training and testing the device connectivity prediction model 216. In some embodiments, the serial number of the device can be discarded when training the device connectivity prediction model 216, as the serial number could result in a skewing effect.

FIG. 6 shows a combined connectivity data record 600 in an illustrative embodiment. It is noted that the combined dataset record 600 corresponds to the device having serial number 1234ABC in FIG. 3. The combined dataset record 600 also includes the connectivity score that was computed based on the event in the timeline 500.

The features within the combined dataset record 600 can be scaled and transformed to help the device connectivity prediction model 216 process these features more effectively. This can include, for example, one-hot encoding techniques (e.g., for features without inherent ordering) or label encoding (for features with designated categories), and encoding times (e.g., timestamps) as time-difference values (e.g., in seconds, minutes, hours, etc.).

Figure 7:
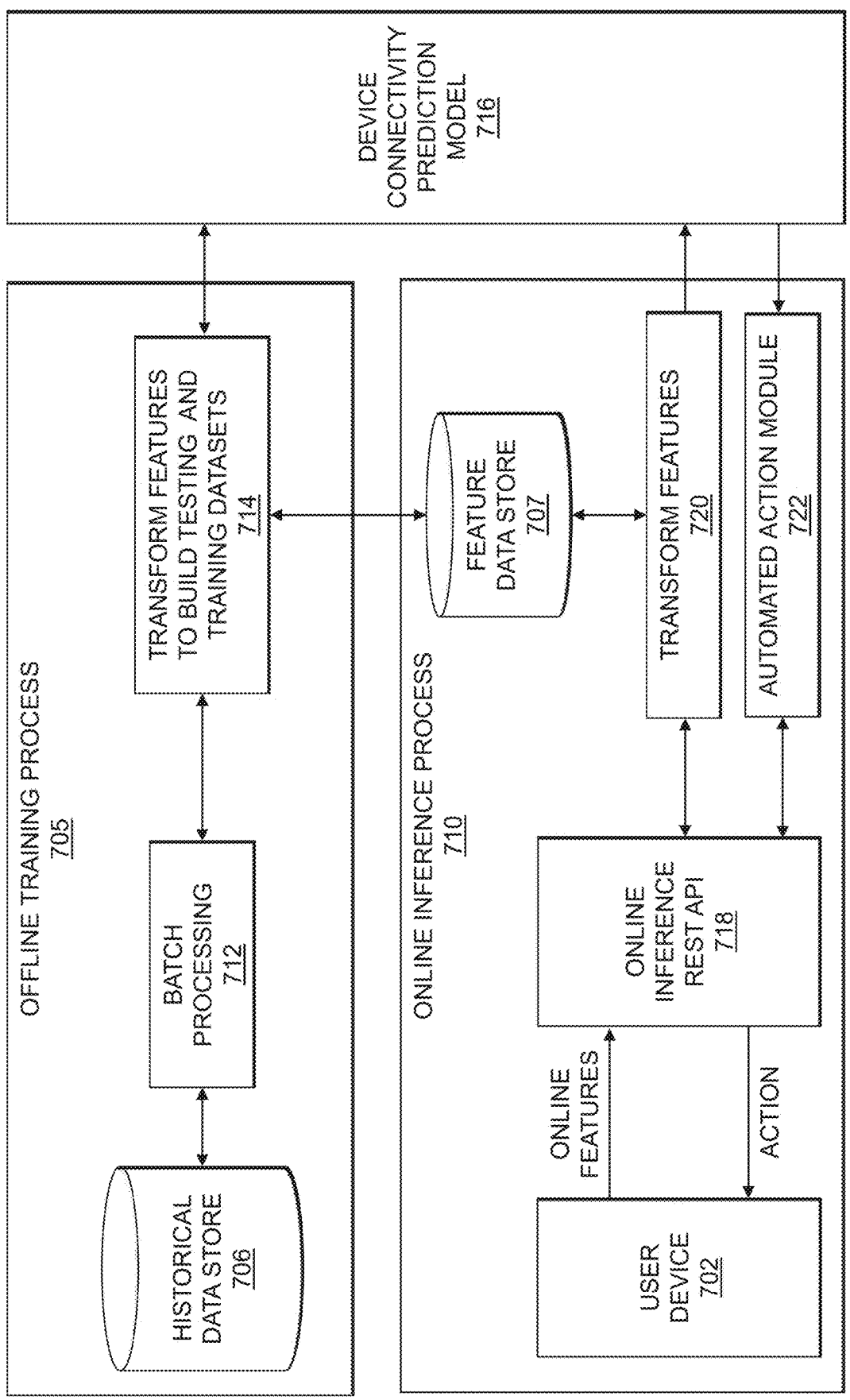
FIG. 7 shows a training and runtime architecture in an illustrative embodiment.

FIG. 7 shows a training and runtime architecture in an illustrative embodiment. The example shown in FIG. 7 includes offline training process 705 and online inference process 710. The offline training process 705 is used to train a device connectivity prediction model 716 that can be used to predict a connectivity score for a given set of connectivity state features. A historical data store 706 can include device data for a plurality of devices, such as the device data 300. Batch processing 712 is performed on the historical data store 706 to generate combined dataset records (e.g., as shown in FIG. 6) by identifying and generating snapshots for the plurality of devices and computing connectivity scores for the snapshots. The features of the combined dataset records are then transformed to build testing and training datasets, as shown at stage 714, which are then used to train and test the device connectivity prediction model 716. In some embodiments, the transformed features can be stored in a feature data store 707.

The online inference process 710 obtains online features from a user device 702. An online inference Representational State Transfer (REST) API 718 is used for transforming the online features to align with the inputs expected by the device connectivity prediction model 716, as shown at 720. The online features represent a connectivity configuration of the user device 702 that is to be analyzed by the device connectivity prediction model 716. The transformed features are stored in the feature data store 707.

The device connectivity prediction model 716 processes the transformed online features of the user device 702 and outputs a connectivity score to an automated action module 722. The predicted connectivity score can be used in various ways depending on the implementation of the device connectivity prediction model 716 and observed behavior of the user device 702. As a non-limiting example, a scalar value (e.g., a predicted connectivity score >1.2) can be mapped to a blocking exception. Another example is that a vector value can be calculated by comparing the predicted connectivity score to a previously recorded connectivity score. If the connectivity increased by at least a designated amount (e.g., an increase of 0.8), the automated action can include initiating a blocking exception. A vector describing a change as a relative change in a connectivity score may also be used. For example, a connectivity score that increases between two percentage values (e.g., 40% and 80%) can result in initiating execution of a detailed diagnostic script on the user device 702. In at least some embodiments, the distribution of connectivity scores can be determined for one or more subcategories of devices (e.g., based on product models and/or versions), and the automated action can be based on where the predicted connectivity score is placed within the distribution (e.g., >1.5σ then an automated diagnostic test is initiated on the device, where "σ" indicates a standard deviation). It should be appreciated that the mapping between connectivity scores and actions is flexible, and remote connectivity capabilities (e.g., automated scripting via remote access) can be used to perform such actions.

In some cases, the connectivity health of a given device may gradually decline as a result of a sequence of changes over an extended time period. In other cases, it may be possible to identify a clear point of divergence (e.g., from a healthy state to an unhealthy state), based on a single change, for example. When such divergence occurs (e.g., due to a bug in a new firmware release), there is often a delay before its impact can be proactively addressed. In such examples, there can still be devices that need to be fixed. In at least some embodiments, the machine learning models described herein can also be used for performing a reactive analysis, which can help reduce the time needed to resolve such connectivity issues.

It is to be appreciated that the device connectivity prediction model 716 can be trained based on changes in connectivity configurations of user devices. As an example, consider a particular type of device having a connectivity configuration represented by a set of values (e.g., corresponding to features in the training dataset, the testing dataset, and/or the feature data store 707). In some embodiments, the device connectivity prediction model 716 can predict the probability of whether a device's connectivity will deteriorate for any potential future set of configuration values. In such embodiments, the connectivity score generated by the device connectivity prediction model 716 can indicate the impact of making changes to a particular setting of the configuration value. For example, the connectivity score can indicate that if a particular setting is changed from a first value to a second value, then it might negatively impact the connectivity of the device based on the other values of the connectivity configuration and suggest an alternative value for the particular setting to mitigate or avoid the negatively impacting the device's connectivity and/or changing one or more of the other values in the set of values to mitigate or avoid the second value from negatively impacting the device connectivity.

In some embodiments, connectivity scores can be tracked over time, potentially across multiple devices for a set of known device configurations, and the connectivity scores can be mapped to different connectivity outcomes. In such embodiments, a current connectivity score of a given device can be compared to the tracked connectivity scores to initiate one or more automated actions, such as providing feedback about the current connectivity configuration or implementing one or more changes to adjust the current configuration.

Figure 8:
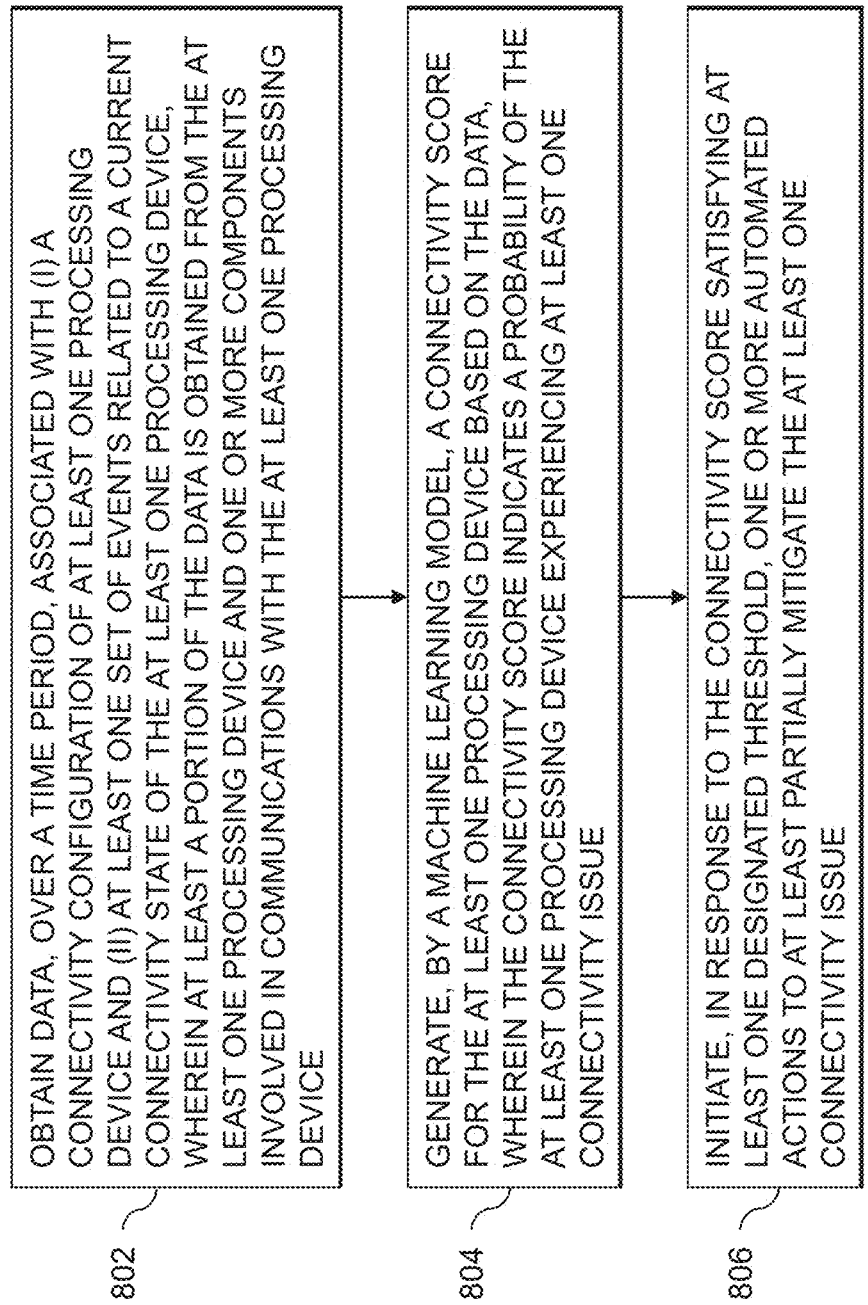
FIG. 8 shows a flow diagram of a process for device connectivity monitoring in an illustrative embodiment.

FIG. 8 is a flow diagram of a process for device connectivity monitoring in an illustrative embodiment. It is to be understood that this particular process is only an example, and additional or alternative processes can be carried out in other embodiments.

In this embodiment, the process includes steps 802 through 806. These steps are assumed to be performed by the device connectivity system 105 utilizing its elements 112, 114, 116, and 118.

Step 802 includes obtaining data, over a time period, associated with (i) a connectivity configuration of at least one processing device and (ii) at least one set of events related to a current connectivity state of the at least one processing device, where at least a portion of the data is obtained from the at least one processing device and one or more components involved in communications with the at least one processing device.

Step 804 includes generating, by a machine learning model, a connectivity score for the at least one processing device based on the data, wherein the connectivity score indicates a probability of the at least one processing device experiencing at least one connectivity issue.

Step 806 includes initiating, in response to the connectivity score satisfying at least one designated threshold, one or more automated actions to at least partially mitigate the at least one connectivity issue.

The machine learning model may be trained based at least in part on historical data associated with a plurality of processing devices. The historical data may be indicative of causal relationships between the historical data and connectivity outcomes of the plurality of processing devices.

The historical data for a given one of the plurality of processing devices may include a plurality of snapshots of connectivity states of the given processing device, wherein each of the plurality of snapshots corresponds to a different historical time period.

The process may include retraining the machine learning model based at least in part on the obtained data.

The data corresponding to the connectivity configuration may include one or more hardware characteristics of at least one of the at least one processing device and the one or more components. The data corresponding to the connectivity configuration may include one or more software characteristics of at least one of the at least one processing device and the one or more components.

The at least one set of events may be associated with at least one of a time threshold between connectivity test signals sent by the at least one processing device, a time threshold between telemetry data sent by the at least one processing device, a status of at least one messaging protocol used by the at least one processing device, a threshold number of exceptions associated with the at least one processing device, the exceptions corresponding to at least one of an application-level exception and a network-level exception, and one or more support cases associated with the at least one processing device.

The one or more communications may include one or more edge network communications, and the one or more components may include at least one of one or more edge gateways and one or more edge servers.

The one or more automated actions may include sending at least one alert to one or more designated recipients and/or automatically causing the at least one processing device to perform one or more self-test processes to identify at least one of one or more firmware issues, one or more hardware issues, and one or more application issues. The one or more automated actions may alternatively or additionally include automatically adjusting the connectivity configuration of the at least one processing device.

The process may further include maintaining a virtual replica of the at least one processing device, and updating the virtual replica based at least in part on the obtained data.

The connectivity score may be generated by the machine learning model as a continuous value.

The process may further include obtaining additional data associated with one or more other processing devices over the same time period and generating respective connectivity scores for each of the one or more other processing devices based at least in part on the obtained additional data.

The designated threshold may be adjusted based on historical data of connectivity outcomes for similar devices.

The process may further include selecting the one or more automated actions from a plurality of automated actions based on a mapping between the one or more automated actions and one or more respective connectivity score values.

The process may further include comparing the generated connectivity score to a set of existing connectivity scores to determine connectivity outcomes for one or more changes to the connectivity configuration of the at least one device.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-mentioned illustrative embodiments provide significant advantages relative to conventional approaches. For example, some embodiments are configured to utilize machine learning algorithms to efficiently monitor and analyze relationships between device state and connectivity health. Additionally, at least some embodiments can proactively identify and automatically remediate potential connectivity issues, thereby improving service reliability and reducing downtime, for example. These and other embodiments can effectively overcome problems associated with existing techniques that rely on reactive maintenance after connectivity issues have already occurred.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
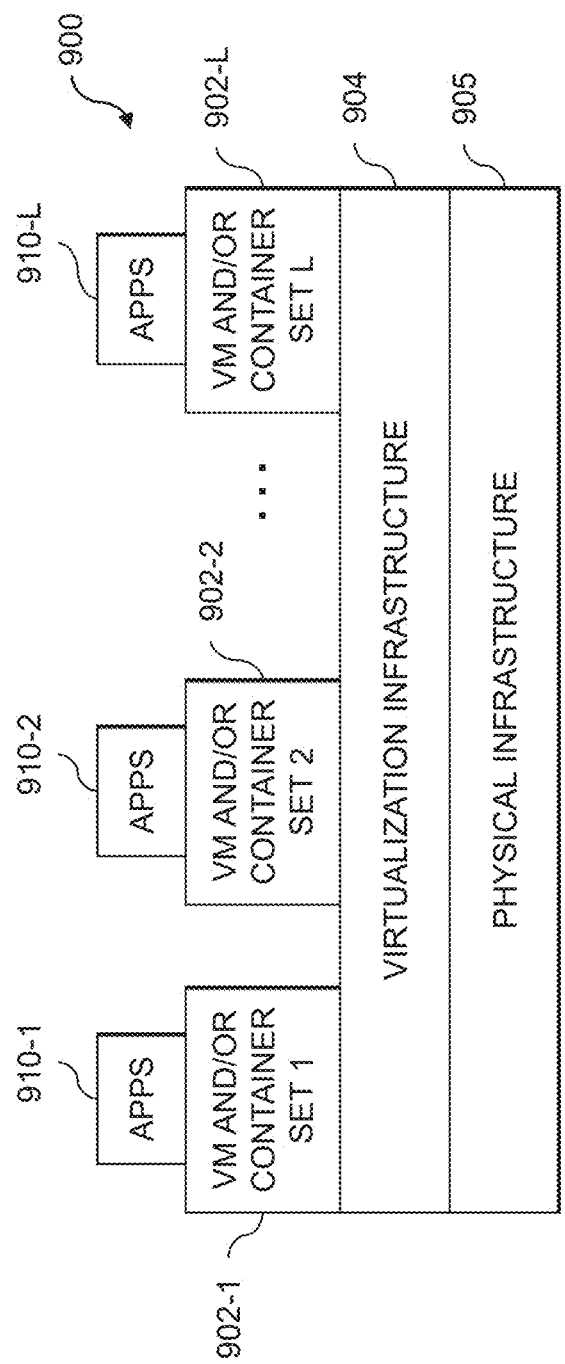
FIGS. 9 and 10 show examples of processing platforms that may be utilized to implement at least a portion of an information processing system in illustrative embodiments.
Figure 10:
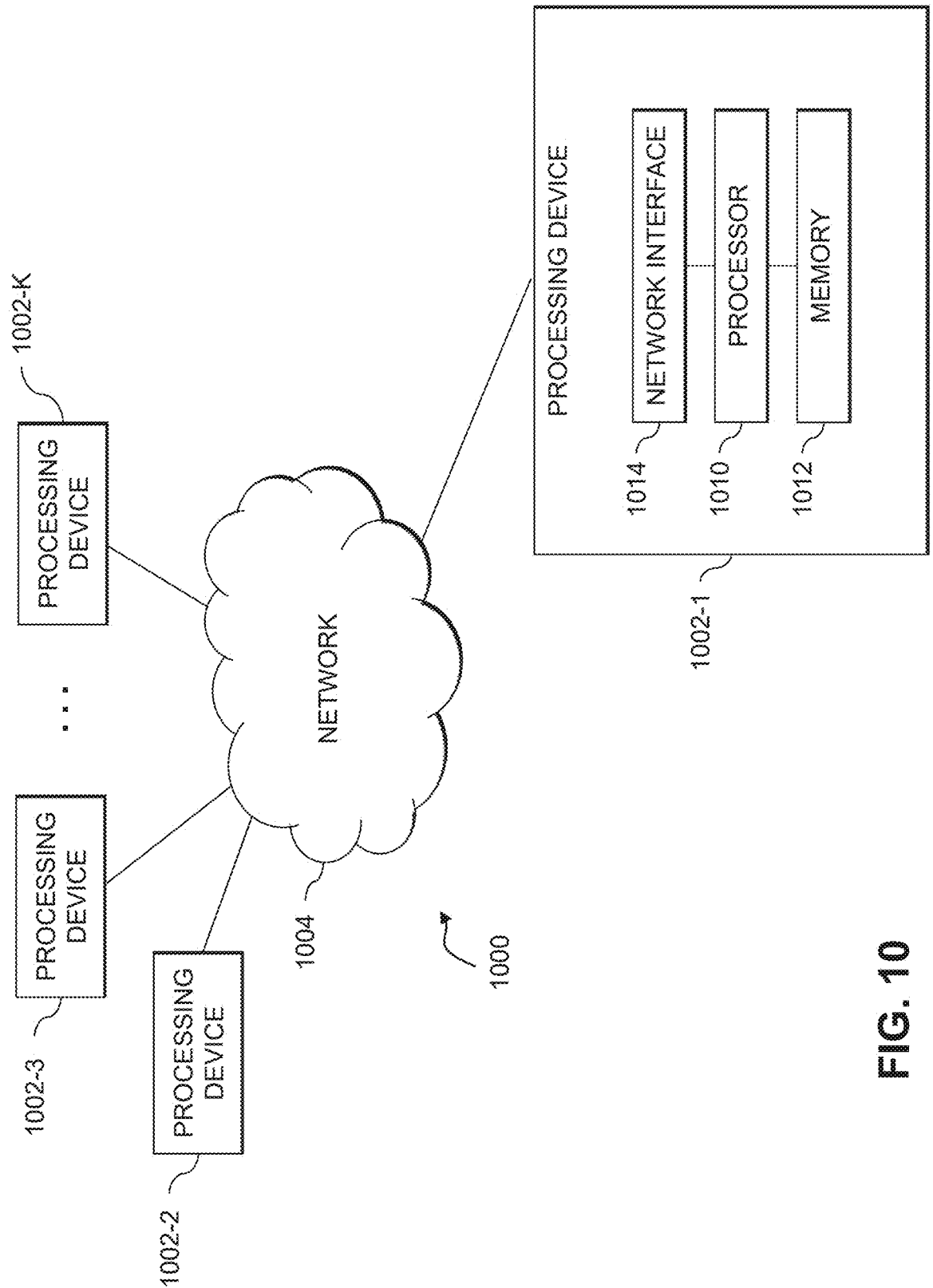

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a microcontroller, an ASIC, an FPGA or other type of processing circuitry, as well as portions or combinations of such circuitry elements.

The memory 1012 comprises RAM, ROM or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining data, over a time period, associated with (i) a connectivity configuration of at least one processing device and (ii) at least one set of events related to a current connectivity state of the at least one processing device, wherein at least a portion of the data is obtained from the at least one processing device and one or more components involved in communications with the at least one processing device;
    generating, by a machine learning model, a connectivity score for the at least one processing device based on the data, wherein the connectivity score indicates a probability of the at least one processing device experiencing at least one connectivity issue;
    comparing the generated connectivity score to a set of existing connectivity scores to determine connectivity outcomes for one or more changes to the connectivity configuration of the at least one processing device; and
    initiating, in response to the connectivity score satisfying at least one designated threshold, one or more automated actions to at least partially mitigate the at least one connectivity issue;
    wherein the method is performed by at least one additional processing device comprising a processor coupled to a memory.

2. The computer-implemented method of claim 1, wherein the machine learning model is trained based at least in part on historical data associated with a plurality of processing devices, wherein the historical data is indicative of causal relationships between the historical data and connectivity outcomes of the plurality of processing devices.

3. The computer-implemented method of claim 2, wherein the historical data for a given one of the plurality of processing devices comprises a plurality of snapshots of connectivity states of the given processing device, wherein each of the plurality of snapshots corresponds to a different historical time period.

4. The computer-implemented method of claim 2, further comprising:
    retraining the machine learning model based at least in part on the obtained data.

5. The computer-implemented method of claim 1, wherein the data corresponding to the connectivity configuration comprises at least one of:
    one or more hardware characteristics of at least one of: the at least one processing device and the one or more components; and
    one or more software characteristics of at least one of: the at least one processing device and the one or more components.

6. The computer-implemented method of claim 1, wherein the at least one set of events is associated with at least one of:
    a time threshold between connectivity test signals sent by the at least one processing device;
    a time threshold between telemetry data sent by the at least one processing device;
    a status of at least one messaging protocol used by the at least one processing device;
    a threshold number of exceptions associated with the at least one processing device, the exceptions corresponding to at least one of an application-level exception and a network-level exception; and
    one or more support cases associated with the at least one processing device.

7. The computer-implemented method of claim 1, wherein the one or more communications comprise one or more edge network communications, and wherein the one or more components comprise at least one of:
    one or more edge gateways; and
    one or more edge servers.

8. The computer-implemented method of claim 1, wherein the one or more automated actions comprise at least one of:
    sending at least one alert to one or more designated recipients;
    automatically causing the at least one processing device to perform one or more self-test processes to identify at least one of: one or more firmware issues, one or more hardware issues, and one or more application issues; and
    automatically adjusting the connectivity configuration of the at least one processing device.

9. The computer-implemented method of claim 1, further comprising:
    maintaining a virtual replica of the at least one processing device; and
    updating the virtual replica based at least in part on the obtained data.

10. The computer-implemented method of claim 1, wherein the connectivity score is generated by the machine learning model as a continuous value.

11. The computer-implemented method of claim 1, further comprising:
    obtaining additional data associated with one or more other processing devices over the same time period; and generating respective connectivity scores for each of the one or more other processing devices based at least in part on the obtained additional data.

12. The computer-implemented method of claim 1, wherein the at least one designated threshold is adjusted based on historical data of connectivity outcomes for similar devices.

13. The computer-implemented method of claim 1, further comprising:
    selecting the one or more automated actions from a plurality of automated actions based on a mapping between the one or more automated actions and one or more respective connectivity score values.

14. A non-transitory processor-readable storage medium having stored therein program code of one or more software programs, wherein the program code when executed by at least one first processing device causes the at least one first processing device:
    to obtain data, over a time period, associated with (i) a connectivity configuration of at least one second processing device and (ii) at least one set of events related to a current connectivity state of the at least one second processing device, wherein at least a portion of the data is obtained from the at least one second processing device and one or more components involved in communications with the at least one second processing device;
    to generate, by a machine learning model, a connectivity score for the at least one second processing device based on the data, wherein the connectivity score indicates a probability of the at least one second processing device experiencing at least one connectivity issue;
    to compare the generated connectivity score to a set of existing connectivity scores to determine connectivity outcomes for one or more changes to the connectivity configuration of the at least one second processing device; and
    to initiate, in response to the connectivity score satisfying at least one designated threshold, one or more automated actions to at least partially mitigate the at least one connectivity issue.

15. The non-transitory processor-readable storage medium of claim 14, wherein the machine learning model is trained based at least in part on historical data associated with a plurality of processing devices, wherein the historical data is indicative of causal relationships between the historical data and connectivity outcomes of the plurality of processing devices.

16. An apparatus comprising:
    at least one first processing device comprising a processor coupled to a memory;
    the at least one first processing device being configured:
    to obtain data, over a time period, associated with (i) a connectivity configuration of at least one second processing device and (ii) at least one set of events related to a current connectivity state of the at least one second processing device, wherein at least a portion of the data is obtained from the at least one second processing device and one or more components involved in communications with the at least one second processing device;
    to generate, by a machine learning model, a connectivity score for the at least one second processing device based on the data, wherein the connectivity score indicates a probability of the at least one second processing device experiencing at least one connectivity issue;
    to compare the generated connectivity score to a set of existing connectivity scores to determine connectivity outcomes for one or more changes to the connectivity configuration of the at least one second processing device; and
    to initiate, in response to the connectivity score satisfying at least one designated threshold, one or more automated actions to at least partially mitigate the at least one connectivity issue.

17. The apparatus of claim 16, wherein the machine learning model is trained based at least in part on historical data associated with a plurality of processing devices, wherein the historical data is indicative of causal relationships between the historical data and connectivity outcomes of the plurality of processing devices.

18. The apparatus of claim 17, wherein the historical data for a given one of the plurality of processing devices comprises a plurality of snapshots of connectivity states of the given processing device, wherein each of the plurality of snapshots corresponds to a different historical time period.

19. The non-transitory processor-readable storage medium of claim 15, wherein the historical data for a given one of the plurality of processing devices comprises a plurality of snapshots of connectivity states of the given processing device, wherein each of the plurality of snapshots corresponds to a different historical time period.

20. The non-transitory processor-readable storage medium of claim 14, wherein the data corresponding to the connectivity configuration comprises at least one of:
    one or more hardware characteristics of at least one of: the at least one second processing device and the one or more components; and
    one or more software characteristics of at least one of: the at least one second processing device and the one or more components.

* * * * *